United States Patent
Li et al.

(10) Patent No.: US 12,310,810 B2
(45) Date of Patent: May 27, 2025

(54) ORAL CARE DEVICE

(71) Applicant: Shenzhen Soocas Technology Co., Ltd., Shenzhen (CN)

(72) Inventors: Junhui Li, Shenzhen (CN); Fandi Meng, Shenzhen (CN)

(73) Assignee: Shenzhen Soocas Technology Co., Ltd., Shenzhen (CN)

( * ) Notice: Subject to any disclaimer, the term of this patent is extended or adjusted under 35 U.S.C. 154(b) by 175 days.

(21) Appl. No.: 18/178,222

(22) Filed: Mar. 3, 2023

(65) Prior Publication Data

US 2024/0041582 A1 Feb. 8, 2024

(30) Foreign Application Priority Data

Aug. 5, 2022 (CN) .................. 202210940271.X

(51) Int. Cl.
*A61C 17/36* (2006.01)
*A61C 17/22* (2006.01)

(52) U.S. Cl.
CPC ............ *A61C 17/36* (2013.01); *A61C 17/222* (2013.01); *A61C 17/225* (2013.01); *A61C 2204/002* (2013.01)

(58) Field of Classification Search
CPC ..... A61C 17/36; A61C 17/222; A61C 17/225; A61C 2204/002
See application file for complete search history.

(56) References Cited

U.S. PATENT DOCUMENTS

| | | |
|---|---|---|
| 2006/0097084 A1 | 5/2006 | Gromer |
| 2014/0101872 A1 | 4/2014 | Utsch |
| 2016/0175618 A1 | 6/2016 | Lei |
| 2017/0007384 A1 * | 1/2017 | Wagner ............. A61C 17/0205 |
| 2021/0290338 A1 | 9/2021 | Taylor |

FOREIGN PATENT DOCUMENTS

| | | | |
|---|---|---|---|
| CN | 203953860 U | 11/2014 | |
| CN | 104399191 A | 3/2015 | |
| CN | 105919687 A | 9/2016 | |
| CN | 108042233 B | 4/2019 | |
| CN | 106231956 B * | 7/2019 | ......... A46B 11/0003 |
| CN | 214049160 U * | 8/2021 | |
| CN | 216724839 U | 6/2022 | |
| GB | 2574859 A | 12/2019 | |
| GB | 2575659 A | 1/2020 | |

(Continued)

OTHER PUBLICATIONS

The Office Action of RU patent application No. 2023104861/14 issued on Jun. 15, 2023.

(Continued)

*Primary Examiner* — Shay Karls
(74) *Attorney, Agent, or Firm* — Andrew C. Cheng

(57) ABSTRACT

Disclosed is an oral care device. The oral care device includes a handle part and a care head part, the handle part includes an acoustic motor, and the care head part has a flushing stem parallel to the output axis and a brush head arranged on a head of the flushing stem. According to the oral care device of the present disclosure, a flushing flow path can be reasonably arranged, an overall volume of the oral care device is reduced, it is convenient for a user to operate, and use comfort of the user is improved.

10 Claims, 2 Drawing Sheets

(56) References Cited

FOREIGN PATENT DOCUMENTS

| | | | |
|---|---|---|---|
| JP | 2011206528 | A | 10/2011 |
| KR | 20140029526 | A | 3/2014 |
| RU | 2473295 | C2 | 1/2013 |
| RU | 2536199 | C1 | 12/2014 |
| WO | 2008060482 | A2 | 5/2008 |

OTHER PUBLICATIONS

The extended European search report of EP patent application No. 23159564.6 issued on Dec. 13, 2023.
The Office Action of CN patent application No. 202210940271.X issued on Mar. 19, 2024.

\* cited by examiner

ORAL CARE DEVICE

CROSS-REFERENCE TO RELATED APPLICATIONS

This application claims the benefit of Chinese Application No. 202210940271.X, filed on Aug. 5, 2022. The entire disclosure of the above application is incorporated herein by reference.

TECHNICAL FIELD

The disclosure relates to the technical field of oral cleaning, in particular to an oral care device.

BACKGROUND

An acoustic motor assembly apparatus includes a motor, an eccentric drive shaft, an output shaft operatively connected to the motor, and a power train assembly, and the power train assembly is linked between the eccentric drive shaft and the output shaft. The power train assembly converts rotation of the eccentric drive shaft into oscillating motion of the output shaft.

In the above solution, the eccentric rotation of a shaft rod at a front end of the motor is transmitted to an end of a hollow shaft rod in the middle through an eccentric mechanism, which makes the shaft rod vibrate. The disadvantage of the solution is that the shaft rod of the motor is not concentric with the hollow shaft rod, which leads to redundant vibration. The principle of balance is to use the principle of balance weight, and a brush head can achieve balance in theory through reasonable distribution of mass, so that a centrifugal force in a horizontal direction and a centrifugal force in a vertical direction of the brush head are nearly balanced in a working process.

In addition, the prior art lacks an oral care device that can not only realize a function of brushing teeth, but also realize a function of flushing. Even if there is an existing oral care device that has the functions of brushing teeth and flushing at the same time, it is also necessary to set a motor that provides kinetic energy for flushing liquid in addition to a motor that provides kinetic energy for brushing teeth. In order to avoid interference between the motors and a flushing pipeline, it is also necessary to set the flushing pipeline outside the motor that provides the kinetic energy for brushing teeth. In this way, not only additional pipelines are needed, but also additional volume occupation will be increased, which will increase the volume of the oral care device, holding is not facilitated, operation is inconvenient, and use comfort of a user is reduced.

SUMMARY

A main objective of the present disclosure is to provide an oral care device, which can reasonably arrange a flushing flow path, and reduce an overall volume of the oral care device, it is convenient for a user to operate, and use comfort of the user is improved.

In order to realize the above objective, according to an aspect of the present disclosure, an oral care device is provided, and includes a handle part and a care head part, the handle part is configured to be suitable for hand-holding, and the handle part includes:

an acoustic motor, including a motor body and a power output shaft, wherein the motor body has an output axis extending in a power output direction, the power output shaft is a column extending along the output axis and penetrating through the motor body, the power output shaft is configured to cooperate with the motor body and transmit output power of the motor body, and the power output shaft has an axial channel parallel to the output axis; and an outer shell, having an outer wall and accommodating cavities enclosed by the outer wall, wherein the accommodating cavities include a mounting cavity and a water storage cavity which are separated from each other, and an extension direction of the mounting cavity is consistent with an extension direction of the output axis; the power output shaft and the motor body are mounted in the mounting cavity, and one end, adjacent to the care head part, of the outer wall is provided with a mounting shaft hole which allows the power output shaft to penetrate and forms an assembly fit with the power output shaft;

the care head part has a flushing stem parallel to the output axis and a brush head arranged on a head of the flushing stem, wherein the flushing stem is mounted on the power output shaft, the brush head includes bristles and a spray head, the bristles extend in a direction at a preset included angle with the output axis, an orientation of a nozzle of the spray head is the same as an orientation of the bristles, and the flushing stem has a fluid channel capable of communicating the spray head with the axial channel;

along the extension direction of the output axis, the axial channel has an inlet and an outlet, the inlet of the axial channel is capable of communicating with the water storage cavity, and the outlet of the axial channel is capable of communicating with the care head part; and during use of the oral care device, water in the water storage cavity can enter the axial channel through the inlet of the axial channel, flows from a first end of the motor body to a second end thereof through the axial channel, then enters the care head part from the outlet of the axial channel, and sprays out from the brush head of the care head part.

Further, a hardness range of the power output shaft is Rockwell hardness HRC: 17-70, and a thickness of a single side wall thereof is 0.3 mm-1 mm.

Further, a cross section of the axial channel is circular, a diameter of the axial channel is 2 mm-5 mm, the power output shaft is cylindrical, and a diameter of the power output shaft is 3 mm-6 mm.

Further, in a section perpendicular to the output axis, a ratio of a sectional area of the power output shaft to a sectional area of the axial channel is in the range of 1.5-9, a thickness of a single side wall of the power output shaft is 0.3 mm-1 mm, and an inner diameter of the axial channel is 0.5 mm-3 mm.

Further, the axial channel penetrates through the power output shaft in an axial direction of the power output shaft, the inlet is located in one end, away from the care head part, of the axial channel, and the outlet is located at the other end, close to the care head part, of the axial channel.

Further, the power output shaft is of an integrally-formed structure.

Further, the power output shaft is of a segmented structure, and each segment of the power output shaft is fixedly connected to one another.

Further, the power output shaft includes a first shaft portion, a second shaft portion and a third shaft portion which are sequentially connected, the first shaft portion is configured to cooperate with the motor body, the second shaft portion is configured to cooperate with the mounting shaft hole, and the third shaft portion is configured to cooperate with the care head part.

Further, a diameter of the first shaft portion is 3 mm-3.5 mm, and a wall thickness thereof is 0.5 mm-0.75 mm; a diameter of the second shaft portion is 4 mm-6 mm, and a wall thickness thereof is 1 mm-2 mm; a diameter of the third shaft portion is 3.5 mm-6 mm, and a wall thickness thereof is 0.75 mm-2 mm; and the second shaft portion is provided with a sealing groove, a depth of the sealing groove is 0.1 mm-0.3 mm, the third shaft portion is provided with a positioning clamp groove, and a depth of the positioning clamp groove is 0.3 mm-0.5 mm.

Further, the oral care device further includes a fluid mechanism and a battery, wherein the fluid mechanism includes a fluid inlet capable of transporting incoming fluid into the fluid mechanism and a fluid outlet capable of transmitting the incoming flow to the inlet of the axial channel, and the fluid mechanism further includes a power apparatus capable of providing a driving action force for flowing of a fluid; and the battery can provide energy for the power apparatus and the acoustic motor, the battery is arranged at one end, away from the acoustic motor, of the fluid mechanism, and the acoustic motor, the fluid mechanism and the battery are arranged sequentially along a direction parallel to the output axis.

By applying the technical solution of the present disclosure, the oral care device sets the power output shaft of the acoustic motor as the column extending along the output axis and penetrating through the motor body, and makes the power output shaft form the axial channel parallel to the output axis. When the fluid pumped from the fluid mechanism reaches a position of the acoustic motor, it is not necessary to perform piping from the outside of the acoustic motor, and it may be directly connected with the power output shaft of the acoustic motor, so that the fluid outlet of the fluid mechanism communicates with the axial channel of the power output shaft, and the axial channel of the power output shaft can be used for fluid transmission. A structure of the acoustic motor can be more fully and reasonably used, so that the structural layout of the flushing flow path is more reasonable, fluid pipelines are reduced, the space occupation is saved, the oral care device is smaller in overall volume and less in weight, the handle part may be made thinner, holding is more facilitated, it is convenient for the user to operate, and the use comfort of the user is improved.

BRIEF DESCRIPTION OF THE DRAWINGS

Accompanying drawings of the specification, which constitute a part of the present application, are used to provide a further understanding of the present disclosure, the schematic embodiments and their descriptions of the present disclosure are used to explain the present disclosure, and do not constitute an improper limitation to the present disclosure. In the accompanying drawings.

Figure 1:
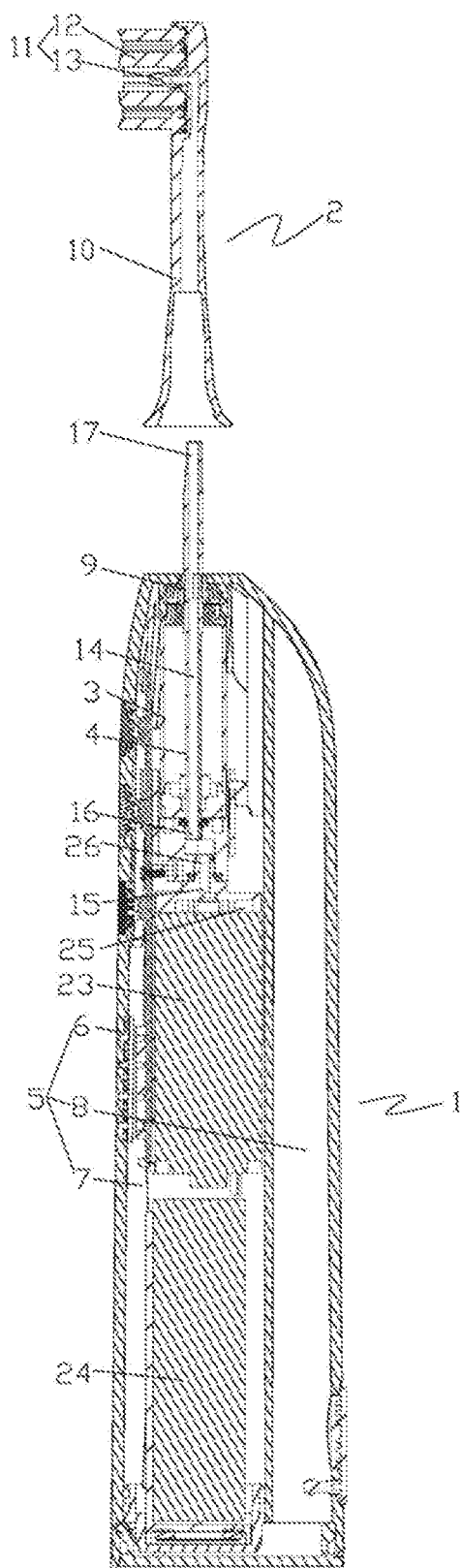
FIG. 1 shows a sectional structural diagram of an oral care device in accordance with an embodiment of the present disclosure.

The above accompanying drawings include the following reference numerals:

1. Handle part; 2. Care head part; 3. Motor body; 4. Power output shaft; 5. Outer shell; 6. Outer wall; 7. Mounting cavity; 8. Water storage cavity; 9. Mounting shaft hole; 10. Flushing stem; 11. Brush head; 12. Bristles; 13. Spray head; 14. Axial channel; 15. Fluid channel; 16. Inlet; 17. Outlet; 18. First shaft portion; 19. Second shaft portion; 20. Third shaft portion; 21. Sealing groove; 22. Positioning clamp groove; 23. Fluid mechanism; 24. Battery; 25. Fluid inlet; and 26. Fluid outlet.

DETAILED DESCRIPTION

It should be noted that the embodiments and features in the embodiments of the present application may be combined with each other in the case of no conflict. The present disclosure will be described in detail below with reference to the accompanying drawings and in combination with the embodiments.

Figure 2:
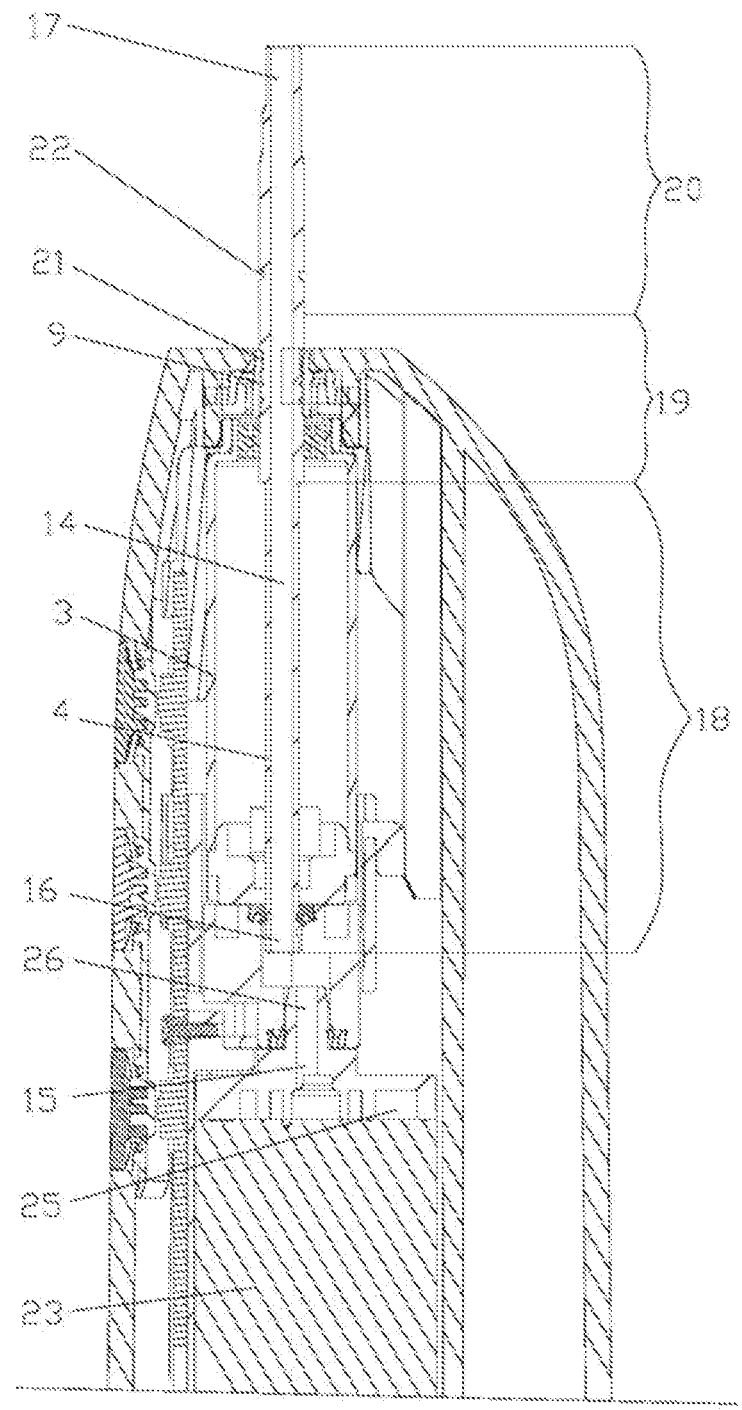
FIG. 2 shows a locally enlarged sectional structural diagram of an oral care device in accordance with an embodiment of the present disclosure.

Referring to FIG. 1 to FIG. 2, the present disclosure provides an oral care device, including a handle part 1 and a care head part 2. The handle part 1 is configured to be suitable for hand-holding, and includes an acoustic motor and an outer shell 5, the acoustic motor includes a motor body 3 and a power output shaft 4, and the motor body 3 has an output axis extending in a power output direction. The power output shaft 4 is a column extending along the output axis and penetrating through the motor body 3, the power output shaft 4 is configured to cooperate with the motor body 3 and transmit output power of the motor body 3, and the power output shaft 4 has an axial channel 14 parallel to the output axis.

The outer shell 5 has an outer wall 6 and accommodating cavities enclosed by the outer wall 6, the accommodating cavities include a mounting cavity 7 and a water storage cavity 8 which are separated from each other, and an extension direction of the mounting cavity 7 is consistent with an extension direction of the output axis. The power output shaft 4 and the motor body 3 are mounted in the mounting cavity 7, and one end, adjacent to the care head part 2, of the outer wall 6 is provided with a mounting shaft hole 9 which allows the power output shaft 4 to penetrate out and form an assembly fit with the power output shaft 4.

The care head part 2 has a flushing stem 10 parallel to the output axis and a brush head 11 arranged on a head of the flushing stem 10, the flushing stem 10 is mounted on the power output shaft 4, the brush head 11 includes bristles 12 and a spray head 13, the bristles 12 extend in a direction at a preset included angle with the output axis, an orientation of a nozzle of the spray head 13 is the same as an orientation of the bristles 12, and the flushing stem 10 has a fluid channel 15 capable of communicating the spray head 13 with the axial channel 14.

Along the extension direction of the output axis, the axial channel 14 has an inlet 16 and an outlet 17, the inlet 16 of the axial channel 14 is capable of communicating with the water storage cavity 8, and the outlet 17 of the axial channel 14 is capable of communicating with the care head part 2; and during use of the oral care device, water in the water storage cavity 8 can enter the axial channel 14 through the inlet 16 of the axial channel 14, flows from a first end of the motor body 3 to a second end thereof through the axial channel 14, then enters the care head part 2 from the outlet 17 of the axial channel 14, and sprays out from the brush head 11 of the care head part 2.

The oral care device sets the power output shaft 4 of the acoustic motor as the column extending along the output axis and penetrating through the motor body 3, and makes the power output shaft 4 form the axial channel 14 parallel to the output axis. When a fluid pumped from the fluid mechanism 23 reaches a position of the acoustic motor, it is not necessary to perform piping from the outside of the acoustic motor, and it may be directly connected with the power output shaft 4 of the acoustic motor, so that the fluid outlet of the fluid mechanism 23 communicates with the axial channel 14 of the power output shaft 4, and the axial channel 14 of the power output shaft 4 can be used for fluid transmission, thus, the fluid flows through the power output shaft 4 inside the acoustic motor, neither are other changes needed in a product structure, nor does it occupy additional space, and a structure of the acoustic motor can be more fully and reasonably used, so that the structural layout of the flushing flow path is more reasonable, fluid pipelines are reduced, the space occupation is saved, the oral care device is smaller in overall volume and less in weight, the handle part may be made thinner, holding is more facilitated, it is convenient for the user to operate, and the use comfort of the user is improved.

In one embodiment, a hardness range of the power output shaft 4 is Rockwell hardness HRC: 17-70, and a thickness of a single side wall thereof is 0.3 mm-1 mm. Practice has proved that among various hardness values of materials, there is an approximate corresponding relationship between a hardness value and a strength value, the hardness value is determined by an initial plastic deformation resistance and a continuous plastic deformation resistance, the higher the strength of the materials, the higher the plastic deformation resistance, and the higher the hardness value. Generally, the higher the hardness of the materials, the better the wear resistance, and the higher the brittleness. Therefore, in order to ensure the hardness and toughness of power output shaft 4 at the same time, it is necessary to reasonably limit the hardness of the power output shaft 4. Setting the hardness of the power output shaft 4 as the above range can ensure that the hardness of the power output shaft 4 can meet power output requirements of the acoustic motor, the problem of plastic deformation of the power output shaft 4 due to insufficient hardness is effectively avoided, and meanwhile the problem that too high hardness causes too high brittleness, which is prone to being broken can also be avoided, so that after the power output shaft 4 is provided with the axial channel 14, it may still have good hardness and toughness, the fluid transmission may be met, at the same time, a power output capacity is ensured, and the service life and working stability of the acoustic motor are ensured.

Within the above hardness range, a wall thickness of the power output shaft 4 is optimized, the wall thickness of the power output shaft 4 may be smaller while ensuring that the structural strength of the power output shaft 4 meets the service life requirements of the acoustic motor, thereby reducing the material consumption, reducing the material cost, reducing the overall weight of the handle part 1, and making the overall weight of the oral care device more suitable for the user.

The power output shaft 4 may be made of stainless steel, specifically 303 steel or 304 steel, or other types of metal or non-metallic materials, as long as it can meet the above hardness requirements.

In one embodiment, a cross section of the axial channel 14 is circular, a diameter of the axial channel 14 is 2 mm-5 mm, the power output shaft 4 is cylindrical, and a diameter of the power output shaft 4 is 3 mm-6 mm. In the embodiment, the diameter of the axial channel 14 is between 2 mm and 5 mm, and the diameter of the power output shaft 4 is between 3 mm and 6 mm, which can not only ensure that the fluid in the axial channel 14 can pass through the axial channel 14 smoothly, provide sufficient flushing water for the care head part 2, but also avoid the problem that the diameter of the axial channel 14 is too large, resulting in the increase of the basic required wall thickness of the power output shaft 4 and the increase of the overall diameter of the acoustic motor, and the increase of a sectional area of the handle part 1 is avoided, so that the handle part 1 can always be easily held.

In one embodiment, an inner wall of the axial channel 14 of the power output shaft 4 is subjected to surface processing, which may be fine drawn or polished, so that the surface accuracy of the inner wall of the axial channel 14 can be improved, the flow resistance of the fluid is reduced, the energy consumption of fluid transmission is reduced, and the fluid transmission efficiency is improved.

In one embodiment, in a section perpendicular to the output axis, a ratio of a sectional area of the power output shaft 4 to a sectional area of the axial channel 14 is in the range of 1.5-9, a thickness of a single side wall of the power output shaft 4 is 0.3 mm-1 mm, and an inner diameter of the axial channel 14 is 0.5 mm-3 mm, so that there may be a good coordination among the wall thickness of the power output shaft 4, the inner diameter of the axial channel 14 and the overall sectional area of the power output shaft 4, it can not only ensure the flow resistance of the fluid in the axial channel 14, but also make the wall thickness of the power output shaft 4 meet the power output requirements of the power output shaft 4, and it can further prevent the diameter of the power output shaft 4 from being too large, so as to avoid the problem that the diameter of the acoustic motor is too large, resulting in too large sectional area of the handle part 1.

In one embodiment, the axial channel 14 penetrates through the power output shaft 4 in an axial direction of the power output shaft 4, the inlet 16 is located at one end, away from the care head part 2, of the axial channel 14, and the outlet 17 is located at the other end, close to the care head part 2, of the axial channel 14. In the embodiment, the axial channel 14 penetrates through the power output shaft 4 in the axial direction. On the one hand, it is convenient to process the axial channel 14, and the processing difficulty of the axial channel 14 on the power output shaft 4 is reduced. On the other hand, it can be convenient to realize communication and matching with the fluid outlet 26 of the fluid mechanism 23, and the matching difficulty is reduced.

In one embodiment, the power output shaft 4 is of an integrally-formed structure, the structural strength, integrity and structural consistency of the power output shaft 4 can be improved, the overall sealing performance of the power output shaft 4 is ensured, meanwhile processing procedures can further be reduced, and the overall structural stability is improved.

In one embodiment, the power output shaft 4 is of a segmented structure, and each segment of the power output shaft is fixedly connected to one another. Since the power output shaft 4 is of a thin-walled slender tube structure, and grooves need to be processed in a peripheral wall, if the power output shaft 4 is processed as a whole, the processing difficulty may be increased, and it is prone to deforming in a processing process, resulting in a high scrap rate. The power output shaft 4 may be segmented according to functions by segmented design, and each segment realizes different functional requirements. In this way, a length of each segment of the power output shaft 4 is small, a length of a pore to be processed is also small, the processing difficulty can be greatly reduced, and the processing stability can be effectively ensured. After the processing of each segment is completed, each segment of the power output shaft 4 may be fixedly connected together by welding or bonding, etc. to form an integrated fixed structure.

In one embodiment, the power output shaft 4 includes a first shaft portion 18, a second shaft portion 19 and a third shaft portion 20 which are sequentially connected, the first shaft portion 18 is configured to cooperate with the motor body 3, the second shaft portion 19 is configured to cooperate with the mounting shaft hole 9, and the third shaft portion 20 is configured to cooperate with the care head part 2. In the embodiment, the power output shaft 4 is divided into three parts according to different matching structures, and the three parts are fixedly connected after being processed, which can facilitate processing and improve processing efficiency.

In one embodiment, a diameter of the first shaft portion 18 is 3 mm-3.5 mm, and a wall thickness thereof is 0.5 mm-0.75 mm; a diameter of the second shaft portion 19 is 4 mm-6 mm, and a wall thickness thereof is 1 mm-2 mm; a diameter of the third shaft portion 20 is 3.5 mm-6 mm, and a wall thickness thereof is 0.75 mm-2 mm; and the second shaft portion 19 is provided with a sealing groove 21, a depth of the sealing groove 21 is 0.1 mm-0.3 mm, the third shaft portion 20 is provided with a positioning clamp groove 22, and a depth of the positioning clamp groove 22 is 0.3 mm-0.5 mm.

In the embodiment, the first shaft portion 18 is arranged in the motor body 3, which is mainly used for rotation fit with the motor body 3, as well as fluid transmission. The periphery of the first shaft portion 18 is of a smooth structure, and it is not necessary to process a groove structure. Therefore, it may be designed according to a smaller wall thickness that can meet the requirements to meet the matching requirements with the motor body 3, so the wall thickness of the segment is designed to be the minimum. The second shaft portion 19 needs to realize the mounting and sealing fit with the outer wall 6, so it is necessary to form a sealing groove 21 in a peripheral wall of the second shaft portion 19, however, the setting of the sealing groove 21 may affect the structural strength of the second shaft portion 19. Therefore, during structural design of the second shaft portion 19, the wall thickness design needs to consider the influence of the sealing groove 21 at the same time, the wall thickness required to be designed needs to meet the minimum wall thickness requirement, and meanwhile, increase the influence of the depth of the sealing groove 21, so that the setting of the sealing groove 21 will not cause the situation that the second shaft portion 19 cannot meet the structural design requirements of the power output shaft 4. Therefore, the diameter and the wall thickness of the second shaft portion 19 are larger than those of the first shaft portion 18. The third shaft portion 20 needs to meet the mounting fit requirements with the care head part 2, and provide a clamping position of a spring for the care head part 2, so it is necessary to process a positioning clamp groove 22 in the third shaft portion 20, and it is also necessary to consider the structural influence of the design of the positioning clamp groove 22 on the third shaft portion 20. Therefore, the diameter of the third shaft portion 20 also needs to be larger than the diameter of the first shaft portion 18. The diameters of the second shaft portion 19 and the third shaft portion 20 may be the same or different, as long as the strength required by each structural design can be met.

In one embodiment, the oral care device further includes a fluid mechanism 23 and a battery 24, the fluid mechanism 23 includes a fluid inlet 25 capable of transporting incoming fluid into the fluid mechanism 23 and a fluid outlet 26 capable of transmitting the incoming flow to the inlet 16 of the axial channel 14, and the fluid mechanism 23 further includes a power apparatus capable of providing a driving action force for flowing of a fluid; and the battery 24 can provide energy for the power apparatus and the acoustic motor, the battery 24 is arranged at one end, away from the acoustic motor, of the fluid mechanism 23, and the acoustic motor, the fluid mechanism 23 and the battery 24 are arranged sequentially along a direction parallel to the output axis.

In the embodiment, under a drive action of the power apparatus of the fluid mechanism 23, after flowing out of the water storage cavity 8, the fluid enters the fluid mechanism 23 through the fluid inlet 25 of the fluid mechanism 23, then flows out of the fluid outlet 26 of the fluid mechanism 23, and is transmitted to the power output shaft 4. The fluid enters the axial channel 14 from the inlet 16 of the axial channel 14 of the power output shaft 4, then flows to the other end of the motor body 3 from the axial channel 14, flows out of the outlet 17 of the axial channel 14 to enter the care head part 2, and finally sprays out from the spray head 13 of the care head part 2, so as to flush the oral. In addition, the acoustic motor can output the power to the care head part 2 through the power output shaft 4, and transmit the power to the brush head 11 through the flushing stem 10 of the care head part 2, so that the brush head 11 can brush under an action of the acoustic motor, and the oral is cleaned by using the bristles 12 of the brush head 11.

It should be noted that the terms used here are only used to describe specific implementations, not intended to limit exemplary implementations according to the present application. As used herein, the singular form is also intended to include the plural form unless the context clearly indicates otherwise. In addition, it should be further understood that when the terms "comprise" and/or "include" are used in the specification, they indicate the existence of features, steps, operations, devices, components and/or combinations thereof.

It should be noted that the terms "first", "second" and the like in the specification, claims and the above accompanying drawings of the present application are used to distinguish similar objects, and should not be understood as describing a specific order or sequence. It should be understood that the data so used may be interchanged under appropriate circumstances, so that the implementations of the present application described herein can be implemented in order other than those illustrated or described herein.

The foregoing descriptions are only preferred embodiments of the present disclosure and are not used to limit the present disclosure. For those skilled in the art, the present disclosure can have various modifications and changes. Any modifications, equivalent replacement, improvement, etc. made within the spirit and principle of the present disclosure should be included in the scope of protection of the present disclosure.

What is claimed is:

1. An oral care device, comprising: a handle part and a care head part, wherein the handle part is configured to be suitable for hand-holding, and the handle part comprises:
    an acoustic motor, comprising a motor body and a power output shaft, wherein the motor body has an output axis extending in a power output direction, the power output shaft is a column extending along the output axis and penetrating through the motor body, the power output shaft is configured to cooperate with the motor body and transmit output power of the motor body, and the power output shaft has an axial channel parallel to the output axis; and
    an outer shell, having an outer wall and accommodating cavities enclosed by the outer wall, wherein the accommodating cavities comprise a mounting cavity and a water storage cavity which are separated from each other, and an extension direction of the mounting cavity is consistent with an extension direction of the output axis; the power output shaft and the motor body are mounted in the mounting cavity, and one end, adjacent to the care head part, of the outer wall is provided with a mounting shaft hole which allows the power output shaft to penetrate and forms an assembly fit with the power output shaft;

the care head part has a flushing stem parallel to the output axis and a brush head arranged on a head of the flushing stem, wherein the flushing stem is mounted on the power output shaft, the brush head comprises bristles and a spray head, the bristles extend in a direction at a preset angle with the output axis, an orientation of a nozzle of the spray head is the same as an orientation of the bristles, and the flushing stem has a fluid channel capable of communicating the spray head with the axial channel;

along the extension direction of the output axis, the axial channel has an inlet and an outlet, the inlet of the axial channel is capable of communicating with the water storage cavity, and the outlet of the axial channel is capable of communicating with the care head part; and during use of the oral care device, water in the water storage cavity can enter the axial channel through the inlet of the axial channel, flows from a first end of the motor body through the motor body to a second end thereof through the axial channel, then enters the care head part from the outlet of the axial channel, and sprays out from the brush head of the care head part;

the oral care device further comprising a fluid mechanism and a battery; the acoustic motor, the fluid mechanism and the battery are arranged sequentially along a direction parallel to the output axis.

2. The oral care device according to claim 1, wherein a hardness range of the power output shaft is Rockwell hardness HRC: 17-70, and a thickness of a single side wall thereof is 0.3 mm-1 mm.

3. The oral care device according to claim 1, wherein a cross section of the axial channel is circular, a diameter of the axial channel is 2 mm-5 mm, the power output shaft is cylindrical, and a diameter of the power output shaft is 3 mm-6 mm.

4. The oral care device according to claim 1, wherein in a section perpendicular to the output axis, a ratio of a sectional area of the power output shaft to a sectional area of the axial channel is in the range of 1.5-9, a thickness of a single side wall of the power output shaft is 0.3 mm-1 mm, and an inner diameter of the axial channel is 0.5 mm-3 mm.

5. The oral care device according to claim 1, wherein the axial channel penetrates through the power output shaft in an axial direction of the power output shaft, the inlet is located at one end, away from the care head part, of the axial channel, and the outlet is located at the other end, close to the care head part, of the axial channel.

6. The oral care device according to claim 1, wherein the power output shaft is of an integrally-formed structure.

7. The oral care device according to claim 6, wherein the power output shaft comprises a first shaft portion, a second shaft portion and a third shaft portion which are sequentially connected, the first shaft portion is configured to cooperate with the motor body, the second shaft portion is configured to cooperate with the mounting shaft hole, and the third shaft portion is configured to cooperate with the care head part.

8. The oral care device according to claim 7, wherein a diameter of the first shaft portion is 3 mm-3.5 mm, and a wall thickness thereof is 0.5 mm-0.75 mm; a diameter of the second shaft portion is 4 mm-6 mm, and a wall thickness thereof is 1 mm-2 mm; a diameter of the third shaft portion is 3.5 mm-6 mm, and a wall thickness thereof is 0.75 mm-2 mm; and the second shaft portion is provided with a sealing groove, a depth of the sealing groove is 0.1 mm-0.3 mm, the third shaft portion is provided with a positioning clamp groove, and a depth of the positioning clamp groove is 0.3 mm-0.5 mm.

9. The oral care device according to claim 1, wherein the power output shaft is of a segmented structure, and each segment of the power output shaft is fixedly connected to one another.

10. The oral care device according to claim 1, wherein the fluid mechanism comprises a fluid inlet capable of transporting incoming fluid into the fluid mechanism and a fluid outlet capable of transmitting the incoming flow to the inlet of the axial channel, and the fluid mechanism further comprises a power apparatus capable of providing a driving action force for flowing of a fluid; and the battery can provide energy for the power apparatus and the acoustic motor, the battery is arranged at one end, away from the acoustic motor, of the fluid mechanism.

* * * * *